United States Patent
Schenk et al.

(10) Patent No.: US 6,647,076 B1
(45) Date of Patent: Nov. 11, 2003

(54) METHOD OF COMPENSATING FOR INTERFERENCE IN A SIGNAL GENERATED BY DISCRETE MULTITONE MODULATION, AND CIRCUIT CONFIGURATION FOR CARRYING OUT THE METHOD.

(75) Inventors: Heinrich Schenk, München (DE); Dietmar Sträussnigg, Villach (AT); Stefan Schneider, Kartitsch (AT)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/449,717

(22) Filed: Nov. 24, 1999

(30) Foreign Application Priority Data

Nov. 24, 1998 (DE) .......................... 198 54 165
Jan. 15, 1999 (DE) .......................... 199 01 465

(51) Int. Cl.[7] .......................... H03D 1/04; H04K 1/02; H03H 7/30
(52) U.S. Cl. .......................... 375/346; 296/229
(58) Field of Search .............. 375/346, 296, 375/295, 377, 130, 222, 229, 231, 232, 298, 261; 320/320, 335, 342, 441; 379/93.08

(56) References Cited

U.S. PATENT DOCUMENTS 6,205,166 B1 * 3/2001 Maruta et al. .............. 375/130
6,373,881 B1 * 4/2002 Mizuguchi et al. ......... 375/147

OTHER PUBLICATIONS

Naofal Al–Dhahir et al.: "Optimum Finite–Length Equalization for Multicarrier Transceivers", *IEEE Transactions on Communications*, vol. 44, No. 1, Jan. 1996, pp. 56–64.

International Publication WO 98/10545 (Isaksson et al.), dated Mar. 12, 1998.

E. Viterbo et al.: :How to combat long echoes in OFDM transmission schemes: Sub–channel equalization or more powerful channel coding, XP 000633651, pp. 2069–2073.

Jukka Rinne et al.: "An improved equalizing scheme for orthogonal frequency division multiplexing systems for time–variant channels", XP 000622920, pp. 879–883.

Jukka Rinne et al.: "An equalization method using preliminary decisions for orthogonal frequency division multiplexing systems in channels with frequency selective fading", XP 000595797, pp. 1579–1583.

Jukka Rinne et al.: "Equalization of Orthogonal Frequency Division Multiplexing Signals", XP 000488584, pp. 415–419.

* cited by examiner

*Primary Examiner*—Khai Tran
(74) *Attorney, Agent, or Firm*—Laurence A. Greenberg; Werner H. Stemer; Ralph E. Locher

(57) ABSTRACT

The invention relates to a method for the compensation of interference in a signal generated by discrete multitone modulation. The signal generated by discrete multitone modulation has a multiplicity of carrier frequencies, and each carrier frequency has a signal vector. An error signal vector is generated from a reference signal vector, which is a signal vector from the multiplicity of signal vectors. The error signal vector is added to each of the remaining signal vectors of the multiplicity of signal vectors for the purpose of compensating for interference. Each of the signal vectors of the multiplicity of signal vectors, except for the reference signal vector, is assigned a set of adjustable coefficients by which the error signal vector is multiplied prior to the addition.

9 Claims, 4 Drawing Sheets

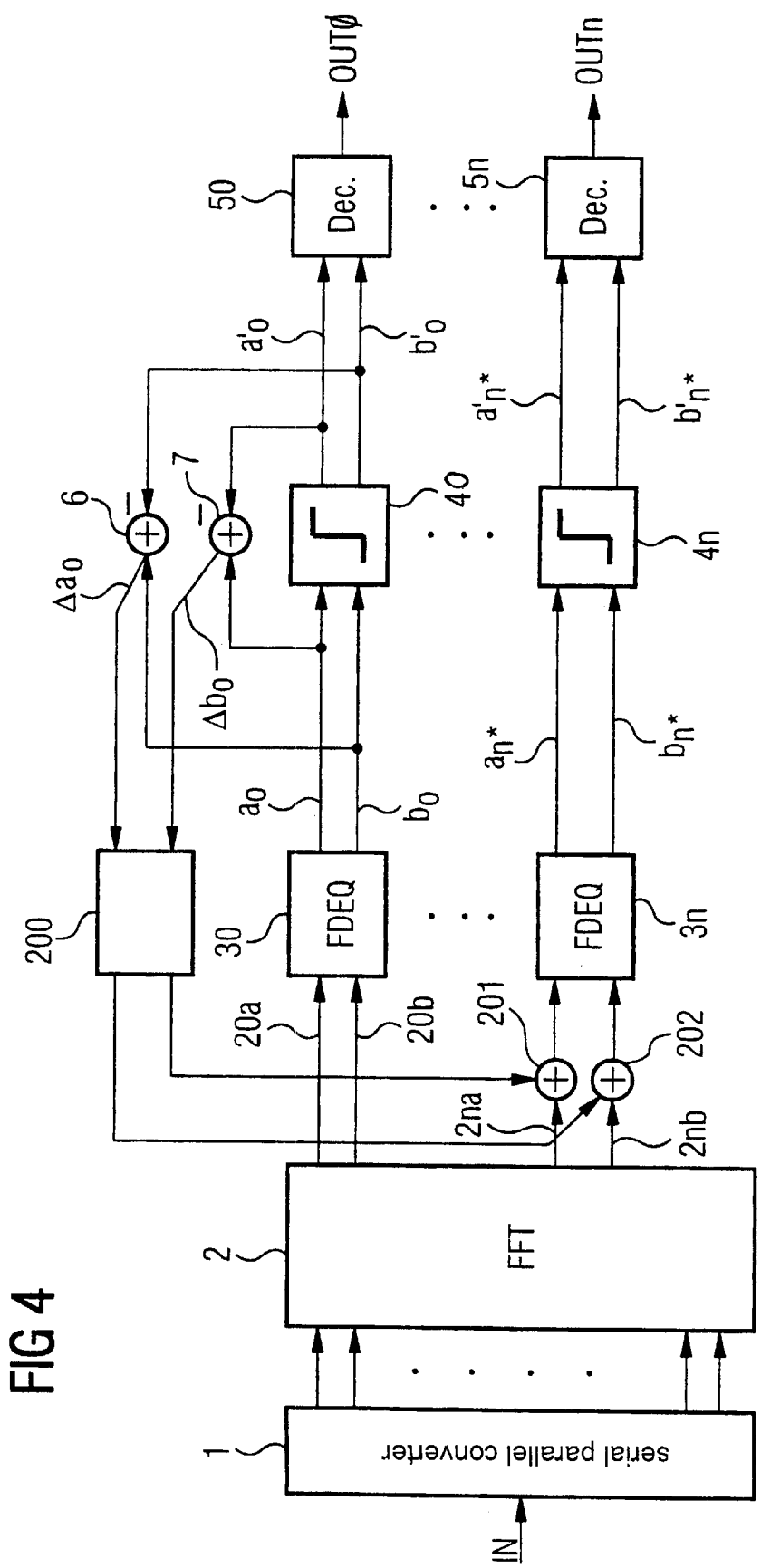

METHOD OF COMPENSATING FOR INTERFERENCE IN A SIGNAL GENERATED BY DISCRETE MULTITONE MODULATION, AND CIRCUIT CONFIGURATION FOR CARRYING OUT THE METHOD.

BACKGROUND OF THE INVENTION

Field of the Invention

The invention lies in the telecommunications field. More specifically, the invention relates to a method for the compensation of interference in a signal generated by discrete multitone modulation, whereby the signal thus generated has a multiplicity of defined carrier frequencies, and each carrier frequency has a signal vector. The invention further pertains to a circuit configuration for carrying out the compensation method.

Discrete multitone modulation (DMT)—or multicarrier modulation—is a modulation method which is suitable in particular for the transmission of data via linearly distorting channels. By comparison with so-called single-carrier methods such as amplitude modulation, for example, which has only one carrier frequency, a multiplicity of carrier frequencies are used in discrete multitone modulation. Each individual carrier frequency is modulated in its amplitude and phase according to quadrature amplitude modulation (QAM). A multiplicity of QAM-modulating signals are thus obtained. A specific number of bits can thereby be transmitted per carrier frequency. Discrete multitone modulation is used for example for digital audio broadcasting (DAB) with the designation OFDM (Orthogonal Frequency Division Multiplex) and for the transmission of data via telephone lines with the designation ADSL (Asymmetric Digital Subscriber Line).

In the case of ADSL, data are transmitted from an exchange to a subscriber, connected via an analog connection in the telephone network, with the aid of a DMT-modulated signal. In that context, ETSI and ANSI standards stipulate that each carrier frequency has a bandwidth of approximately 4 kHz and transports at most up to 15 bit/s/Hz. The actual number of bits/s/Hz may be different for each carrier frequency, as a result of which the data rate and the transmission spectrum can be adapted to the transmission channel.

A DMT transmission system has a coder which combines the bits of a serial digital data signal to be transmitted into blocks. A complex number is assigned in each case to a specific number of bits in a block. A complex number represents a carrier frequency $f_i=i/T$ where $i=1, 2, \ldots, N/2$ of discrete multitone modulation. All the carrier frequencies $f_i$ are distributed equidistantly. T is the time duration of a block. By means of inverse Fourier transformation, the carrier frequencies represented by signal vectors are transformed into the time mode, where they directly represent N samples of a DMT signal to be transmitted. In order to be able to employ inverse fast Fourier transformation (IFFT), a power of two is chosen for N.

After the inverse fast Fourier transformation, a cyclic prefix is implemented, the last M (M<N) of the samples once again being attached to the beginning of a block. As a result, a periodic signal is simulated to a receiver when the transient process generated by a transmission channel has settled after M samples in accordance with a time T·M/N. The outlay on equalization in the receiver can be greatly reduced by the cyclic prefix, since after the demodulation in the receiver, it is only necessary to effect multiplication by the inverse transfer function of the transmission channel in order to eliminate the linear distortions of the transmission channel. This requires one complex or four real multiplications for each carrier frequency.

In the case of ADSL, the transmission channel is a two-wire line (copper pair). The two-wire line requires a long time for the transient process in relation to the length of a block. On the other hand, the additional transmission capacity required by the cyclic prefix should be as small as possible.

Given a block length of N=512, a cyclic prefix of M=32 is stipulated in the case of ADSL. However, the transient process of the two-wire line has still not settled after M=32 values. As a result, interference occurs in the receiver, and cannot be eliminated by a frequency domain equalizer.

Such interference can be reduced in the receiver with the aid of particular signal processing measures.

To that end, a time domain equalizer (TDEQ) is connected upstream of a demodulator. The time domain equalizer is designed as a digital transversal filter having adjustable coefficients. The task of the time domain equalizer is to shorten the transient process of the transmission channel. Accordingly, the number of impulse response values of the digital transversal filter must as far as possible be less than the M samples of the cyclic prefix. The design of such time domain equalizers is described by Al-Dhahir and Cioffi in "Optimum Finite-Length Equalization for Multicarrier Transceivers," IEEE Trans. On Comm., Vol. 44, No. 1, January 1996. What is disadvantageous, however, is the high additional outlay on circuitry for the time domain equalizer, caused by the high number of coefficients (between 20 and 40 coefficients), exhibited by the digital transversal filter used as time domain equalizer. A further disadvantage of such time domain equalizers is the high computation complexity, which amounts to approximately 50 to 100 million multiplications per second given a filter length of 20 to 40 coefficients and necessitates a correspondingly high outlay on circuitry. In addition, each coefficient has to be adjusted for adaptation of the digital transversal filter.

SUMMARY OF THE INVENTION

It is accordingly an object of the invention to provide a method for the compensation of interference in a signal generated by discrete multitone modulation and a circuit configuration for carrying out the method, which overcomes the above-mentioned disadvantages of the heretofore-known devices and methods of this general type and which require a smaller outlay on circuitry than time domain equalizers and can be implemented as a simple and fast algorithm and as a simple circuit, respectively.

With the foregoing and other objects in view there is provided, in accordance with the invention, a method of compensating for interference in a signal generated by discrete multitone modulation, wherein the signal generated by discrete multitone modulation has a multiplicity of carrier frequencies each having a signal vector. The method comprises the following method steps:

generating an error signal vector from a reference signal vector, which is a signal vector of the multiplicity of signal vectors in the signal generated by discrete multitone modulation;

assigning to each of the signal vectors of the multiplicity of signal vectors, except for the reference signal vector, a set of adjustable coefficients and multiplying the error signal vector with the adjustable coefficients; and subsequently adding the error signal vector to each remaining signal vector of the multiplicity of signal vectors for the purpose of compensating for interference.

In other words, an error signal vector is generated from a reference signal vector, which is a signal vector from the multiplicity of signal vectors. The error signal vector is added to each of the remaining signal vectors of the multiplicity of signal vectors for the purpose of compensating for interference. Each of the signal vectors of the multiplicity of signal vectors, except for the reference signal vector, is assigned a set of adjustable coefficients by which the error signal vector is multiplied prior to the addition. In an advantageous manner, the error signal is calculated in one simple step of the method and added to the remaining carrier frequencies in a further simple step. On account of the interdependence of interference of each individual carrier frequency, it suffices to calculate the error signal from a carrier frequency. In contrast to time domain equalization, the method can be designed as an algorithm in a very simple manner.

In accordance with an added feature of the invention, the adjustable coefficients are adapted in accordance with transmission conditions of the carrier frequency having the signal vector assigned to the adjustable coefficients. In an advantageous manner, this adaptation of the coefficients results in better suppression of interference as may be contained in the signal vector.

In accordance with an additional feature of the invention, the adjustable coefficients are adjusted using an iterative algorithm for the purpose of minimizing errors.

In accordance with another feature of the invention, the adjustable coefficients are adjusted with a mean square error algorithm.

In accordance with a further feature of the invention, the reference signal vector is mapped in a value-discrete reference signal vector and the value-discrete reference signal vector is subtracted from the reference signal vector for generating the error signal vector.

With the above and other objects in view there is provided, in accordance with the invention, a circuit configuration for compensating for interference in a signal generated by discrete multitone modulation, the signal generated by discrete multitone modulation having a multiplicity of carrier frequencies in the frequency domain, and each carrier frequency having a signal vector, comprising:

a first decision circuit receiving a reference signal vector, the first decision circuit mapping the reference signal vector into a value-discrete reference signal vector;

a subtractor circuit connected to the first decision circuit for forming an error signal vector by subtracting the reference signal vector and the value-discrete reference signal vector from one another;

a multiplicity of adders receiving the error signal vector and adding the error signal vector to each of the remaining signal vectors, except for the reference signal vector; and multiplier circuits connected upstream of each of the adders in a signal flow direction, the multiplier circuits multiplying the error signal vector by adjustable coefficients.

In other words, a reference signal vector is fed to a first decision circuit, which maps the reference signal vector into a value-discrete reference signal vector. A subtractor circuit for forming an error signal vector subtracts the reference signal vector and the value-discrete reference signal vector from one another. The error signal vector is fed to a multiplicity of adders, which add the error signal vector to each of the remaining signal vectors, except for the reference signal vector. Multiplier circuits which multiply the first error signal vector by adjustable coefficients are connected upstream of each of the multiplicity of adders.

In accordance with again an added feature of the invention, the adjustable coefficients are adjustable by a manipulated variable. In a preferred embodiment, the manipulated variable is a power of two. Choosing a power of two for the manipulated variable allows the adjustment of the adjustable coefficients to be carried out by means of a simple shift register.

With the above and other objects in view there is also provided, in accordance with an alternative embodiment of the invention, a method of compensating for interference in a signal generated by discrete multitone modulation, wherein the signal generated by discrete multitone modulation has a multiplicity of carrier frequencies each having a signal vector, which comprises the following method steps:

defining a signal vector of a multiplicity of signal vectors in a signal generated by discrete multitone modulation as a reference signal vector, and generating an error signal vector from the reference signal vector;

calculating interference with the remaining signal vectors of the multiplicity of signal vectors in approximation from the error signal vector; and subtracting the calculated interference from the respective signal vector of the multiplicity of signal vectors for interference compensation.

In this alternative embodiment, the interference in the remaining signal vectors of the multiplicity of signal vectors is calculated as an approximation from the error signal vector, and the calculated interference is subtracted from the respective signal vector of the multiplicity of signal vectors for the purpose of compensating for interference. It is advantageous that adaptive adjustment of coefficients is not necessary in this case. As a result, convergence problems during the adaptation cannot occur either.

Other features which are considered as characteristic for the invention are set forth in the appended claims.

Although the invention is illustrated and described herein as embodied in a method for the compensation of interference in a signal generated by discrete multitone modulation, and circuit configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a schematic diagram of a second exemplary embodiment of the circuit configuration for the compensation of interference in a signal generated by discrete multitone modulation.

DESCRIPTION OF THE PREFERRED EMBODIMENTS

Figure 1:
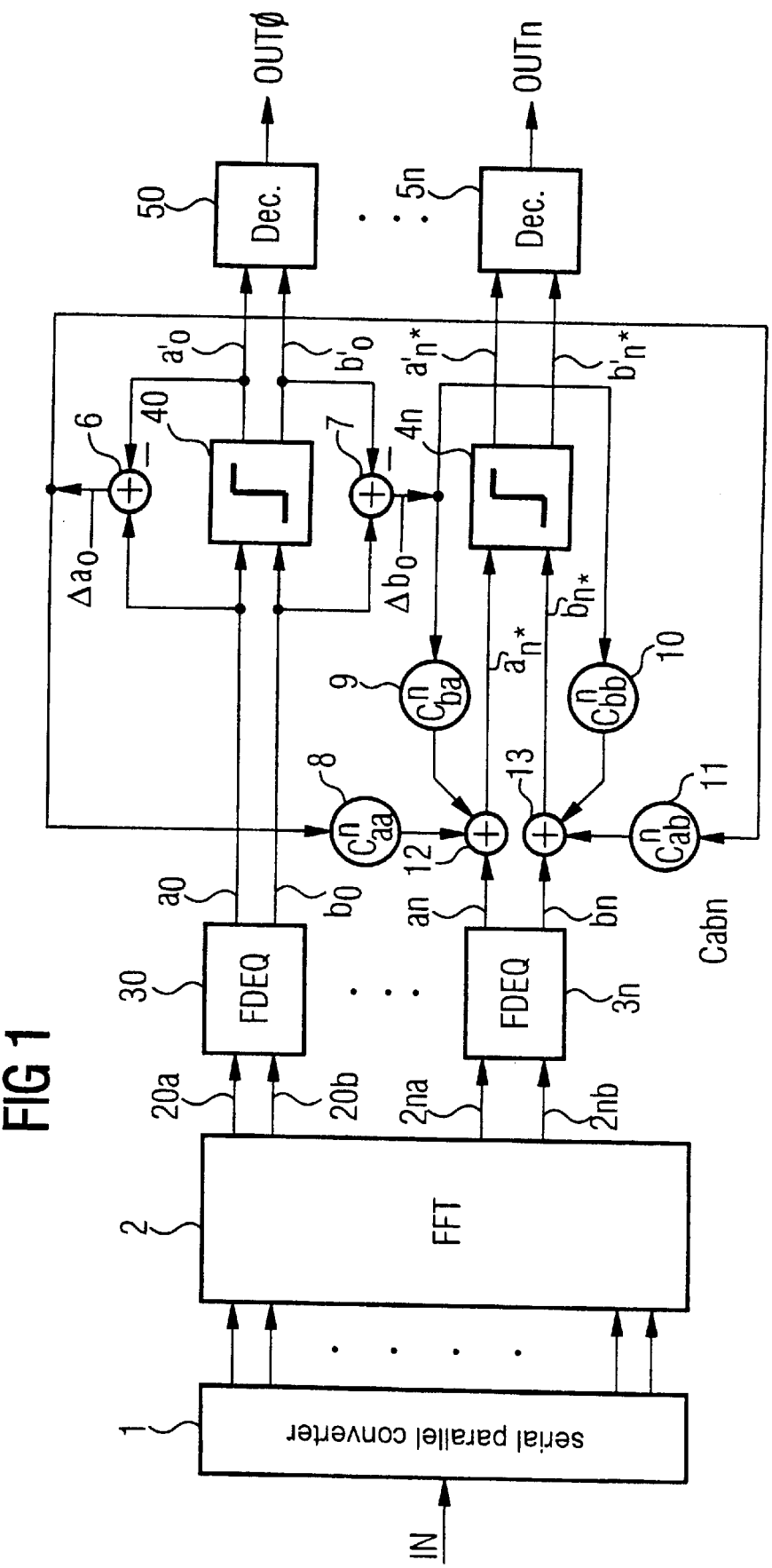
FIG. 1 is a schematic diagram of a first exemplary embodiment of the circuit configuration according to the invention for the compensation of interference in a signal generated by discrete multitone modulation.

Referring now to the figures of the drawing in detail and first, particularly, to FIG. 1 thereof, there is seen an exemplary embodiment of the circuit configuration for the compensation of interference in a signal generated by discrete multitone modulation. A serial-parallel converter 1 receives digital samples of a signal IN generated by discrete multitone modulation. The serial-parallel converter 1 forms blocks from the digital samples fed in, one block having a multiplicity of N parallel signals which are fed to a demodulator 2. In this case, N should be a power of two.

The demodulator 2 is a fast Fourier transformer which converts the multiplicity of N parallel signals fed in in the time domain into a multiplicity of n carrier frequencies f0–fn in the frequency domain. Each carrier frequency is modulated by quadrature amplitude modulation (QAM) in the context of the discrete multitone modulation. Each carrier frequency has a signal vector $20a$, $20b$ to $2na$, $2nb$.

By way of example, in the case of ADSL (Asymmetric Digital Subscriber Line), of 256 carrier frequencies each having a frequency spacing of 4.3125 kHz, the carrier frequencies 7 to 250 corresponding to a frequency spectrum of 30.1875 kHz to 1078.125 kHz are utilized for the signal transmission.

Each signal vector has two elements, which constitute a real part and an imaginary part of a complex number. The absolute value and the phase of the complex number correspond to the carrier frequency (frequency channel, channel) with QAM-modulated signal.

In accordance with the multiplicity of signal vectors or carrier frequencies, provision is made of n frequency domain equalizers $30, \ldots, 3n$ (FDEQ) for the equalization of the signal vectors $20a$, $20b$ to $2na$, $2nb$. A frequency domain equalizer is used for the channel equalization of a signal vector. For this purpose, each frequency domain equalizer can be adapted to the transmission characteristics of the transmission channel that are specific to a carrier frequency.

An equalized signal vector $a_0$, $b_0$ and $a_n$, $b_n$ is respectively present at the output of each frequency domain equalizer $30, \ldots, 3n$.

A decision circuit 40 and $4n$ is respectively connected downstream of each frequency domain equalizer $30, \ldots, 3n$. A decision circuit decides which signal state in the signal state space of the carrier frequencies modulated by QAM is assigned to a signal vector fed in. A signal state corresponds to a value-discrete signal vector having a value-discrete amplitude and a value-discrete phase. What is decisive for correct assignment of a signal vector to a value-discrete signal vector is a signal vector that is interfered with as little as possible by the transmission.

A decoder circuit $50, \ldots, 5n$ is respectively connected downstream of each decision circuit $40, \ldots, 4n$. A decoder circuit decodes, from a value-discrete signal vector fed in, the binary signals OUT0 to OUTn contained in the signal vector.

An arbitrary signal vector $a_0$, $b_0$ is used as reference signal vector. The reference signal vector is converted into a value-discrete reference signal vector $a_0'$, $b_0'$ by the first decision circuit 40. The reference signal vector is used to correct all of the remaining signal vectors. This is possible on account of the interdependence of the individual signal vectors.

An error signal vector is generated from the reference signal vector and is used to correct all the other signal vectors. For this purpose, the real part $a_0$ and the value-discrete real part $a_0'$ of the reference signal vector are fed to a first subtractor circuit 6 and subtracted from one another. A real part $\Delta a_0$ of a complex number which represents the error signal contained in the error signal vector $\Delta a_0$, $\Delta b_0$ is present at the output of the first subtractor circuit 6. The imaginary part $b_0$ and the value-discrete imaginary part $b_0'$ of the reference signal vector are fed, in a corresponding manner to the real parts, to a second subtractor circuit 7. An imaginary part $\Delta b_0$ of the complex number which represents the error signal contained in the error signal vector $\Delta a_0$, $\Delta b_0$ is present at the output of the second subtractor circuit 7.

The formula for forming the elements of the error signal vector from the elements of the reference signal vector reads as follows:

$$\Delta a_0 = a_0 - a'_0 \text{ and } \Delta b_0 = b_0 - b'_0$$

The error signal vector $\Delta a_0$, $\Delta b_0$ is adapted to the signal vector to be corrected and is added, for the purpose of correction, to the signal vector corresponding to a channel to be corrected.

This method is described below using the example of an arbitrary channel corresponding to a signal vector $a_n$, $b_n$. In terms of the method, every channel is corrected except for the channel having the reference signal vector.

The real part $\Delta a_0$ of the error signal vector is fed to a first multiplier circuit 8 and, in parallel, to a second multiplier circuit 11. The first multiplier circuit 8 multiplies the real part $\Delta a_0$ of the error signal vector by a first coefficient $C_{aa}^n$. The second multiplier circuit 11 multiplies the real part $\Delta a_0$ of the error signal vector by a second coefficient $C_{ab}^n$.

The imaginary part $\Delta b_0$ of the error signal vector is fed to a third multiplier circuit 9 and, in parallel, to a fourth multiplier circuit 10. The third multiplier circuit 9 multiplies the imaginary part $\Delta b_0$ of the error signal vector by a third coefficient $C_{ba}^n$. The fourth multiplier circuit 10 multiplies the imaginary part $\Delta b_0$ of the error signal vector by a fourth coefficient $C_{bb}^n$.

The output signal of the first multiplier circuit 8 and of the third multiplier circuit 9 are fed to a first adder circuit 12. A real part $a_n$, of the signal vector, which is present at the output of a frequency domain equalizer $3n$, is likewise fed to the first adder circuit 12. The first adder circuit adds the three signals fed in to form an error-corrected real part $a_{n^*}$ of the signal vector.

The output signal of the second multiplier circuit and of the fourth multiplier circuit are fed to a second adder circuit 13. An imaginary part $b_n$ of the signal vector, which is present at the output of the second frequency domain equalizer $3n$, is furthermore fed to the second adder circuit 13. An error-corrected imaginary part $b_{n^*}$ of the signal vector is present at the output of the second adder circuit 13, which adds the three signals fed in.

The method described above can be expressed by the following formulae:

$$a_{n^*} = a_n + C_{aa}^n \cdot \Delta a_0 + C_{ba}^n 19\, \Delta b_0$$

$$b_{n^*} = b_n + C_{ab}^n \cdot \Delta a_0 + C_{bb}^n \cdot \Delta b_0$$

The error-corrected real part $a_{n^*}$ and the error-corrected imaginary part $b_{n^*}$ of the signal vector are fed to a second decision circuit $4n$, which converts the error-corrected real part $a_{n^*}$ and the error-corrected imaginary part $b_{n^*}$ into a value-discrete real part $a_{n^*}'$ and into a value-discrete imaginary part $b_{n^*}'$ respectively, of a value-discrete signal vector $a_{n^*}'$, $b_{n^*}'$.

The value-discrete signal vector $a_{n^*}'$, $b_{n^*}'$ is fed to a second decoder circuit $5n$. The second decoder circuit $5n$ decodes signals from the signal vector fed in.

In this method, for each signal vector except for the reference signal vector, the error signal vector is weighted in accordance with the channel to be corrected and added to the signal vector representing the channel.

The weighting coefficients $C_{aa}^n$, $C_{ba}^n$, $C_{ab}^n$ and $C_{bb}^n$ for the weighting of the error signal vector can be progressively adjusted using an iterative algorithm for the purpose of minimizing errors, such as the mean square error algorithm (MSE algorithm) for example (in this case k designates a discrete point in time):

$$C_{aa}^n(k) = C_{aa}^n(k-1) - g \cdot \Delta a_0(k) \cdot \Delta a_n(k)$$
$$C_{bb}^n(k) = C_{bb}^n)(k-1) - g \cdot \Delta b_0(k) \cdot \Delta b_n(k)$$
$$C_{ab}^n(k) = C_{ab}^n(k-1) - g \cdot \Delta a_0(k) \cdot \Delta b_n(k) \quad (1)$$
$$C_{ba}^n(k) = C_{ba}^n(k-1) - g \cdot \Delta b_0(k) \cdot \Delta a_n(k)$$

Both the error signal vector $\Delta a_0$, $\Delta b_0$ of the reference signal vector and an error signal vector $\Delta a_n$, $\Delta b_n$ of the $n^{th}$ channel to be corrected are required in order to calculate the weighting coefficients $C_{aa}^n$, $C_{ban}$, $C_{ab}^n$, and $C_{bb}^n$ in accordance with the formulae (1). In this case, the error signal vector $\Delta a_n$, $\Delta b_n$ of the $n^{th}$ channel to be corrected is formed in a corresponding manner to the error signal vector of the reference channel.

If the intention is to eliminate interference from a signal vector only in the lower frequency domain, a simplified algorithm with symmetrical weighting coefficients $C_{aa}^n$, $C_{ba}^n$, $C_{ab}^n$ and $C_{bb}^n$ is sufficient. This may be the case for example when using a time domain equalizer connected upstream of the demodulator 2 and the serial-parallel converter 1. The requirements made of the time domain equalizer are then less stringent than the requirements made of a time domain equalizer without interference compensation. The weighting coefficients $C_{aa}^n$, $C_{ba}^n$, $C_{ab}^n$ and $C_{bb}^n$ are calculated as follows in this case:

$$C_{bb}^n(k) = C_{aa}^n(k-1)$$
$$C_{bb}^n(k) = -C_{aa}^n(k-1) \quad (2a)$$

In an advantageous manner, the storage space required for storing the weighting coefficients is reduced as a result of the symmetry of the weighting coefficients.

In this case the algorithm for adjustment reads as follows:

$$C_{aa}^n(k) = C_{aa}^n(k-1) - g \cdot (\Delta a_0(k) \cdot \Delta a_n(k) + \Delta b_0(k) \cdot \Delta b_n(k))$$
$$C_{ab}^n(k) = C_{ab}^n(k-1) - g \cdot (\Delta a_0(k) \cdot \Delta b_n(k) + \Delta b_0(k) \cdot a_n(k)) \quad (2)$$

Figure 2:
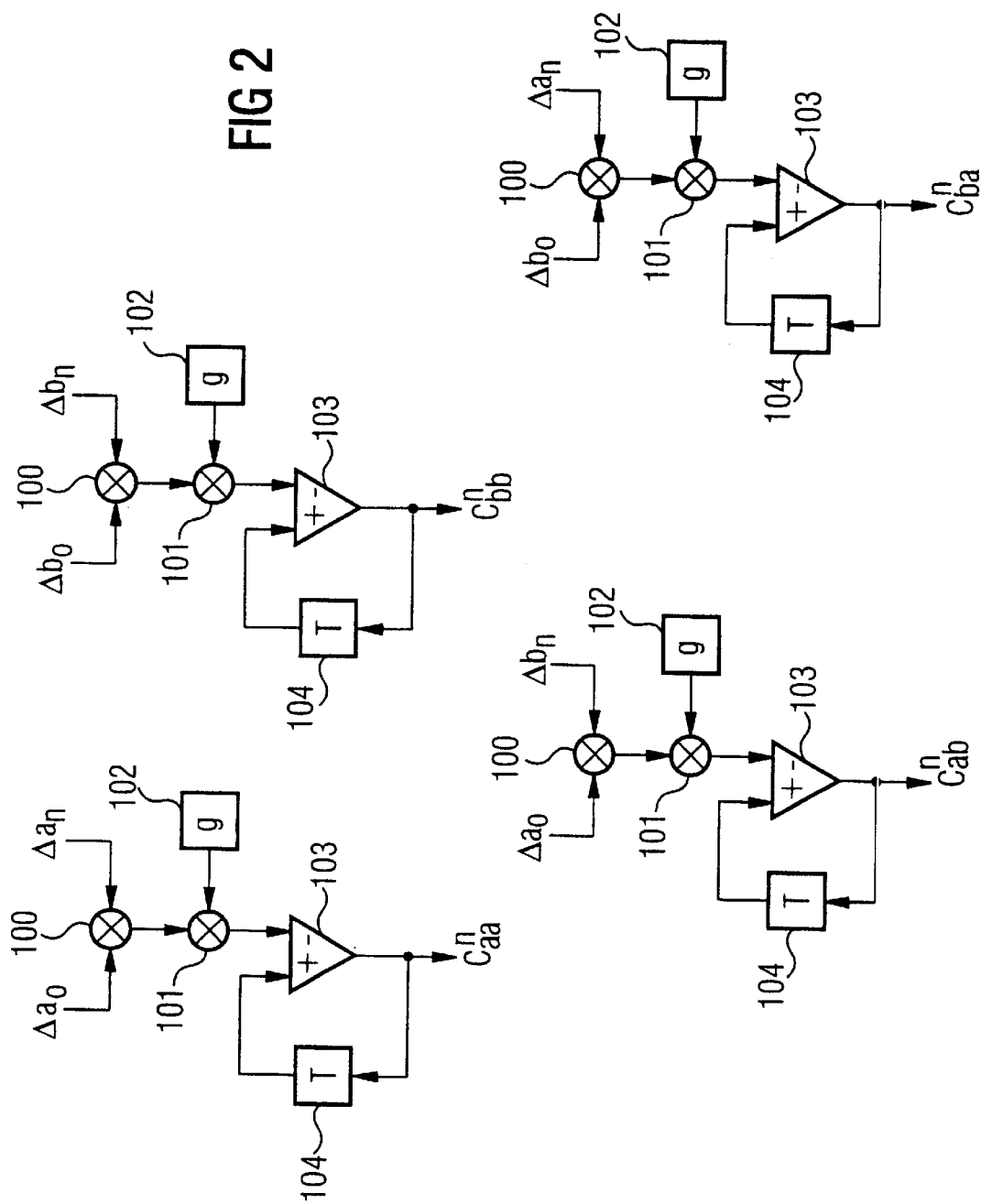
FIG. 2 is a circuit schematic of an exemplary embodiment of the circuit configuration for forming the weighting coefficients of the error signal.

The circuit configurations represented in FIG. 2 calculate the weighting coefficients $C_{aa}^n$, $C_{ba}^n$, $C_{ab}^n$ and $C_{bb}^n$ according to the MSE algorithm in accordance with the formulae (1).

Each of the circuit configurations has a first multiplier 100, which multiplies the real part $\Delta a_0$ or respectively the imaginary part $\Delta b_0$ of the error signal vector of the reference channel by the real part $\Delta a_n$ or respectively the imaginary part $\Delta b_n$ of the error signal vector formed on the channel to be corrected.

A second multiplier 101, connected downstream of the first multiplier 100 in the signal flow direction, multiplies the result of the first multiplier 100 by a manipulated variable g, which is formed in a circuit block 102.

The manipulated variable g is chosen as a power of two $2^{-\mu}$ in order to simplify the multiplication. This means that a simple shift register can be used for the second multiplier 101.

A further simplification can be achieved by merely using the sign for the real part $\Delta a_i$ and the imaginary part $\Delta b_i$ of an error signal vector (this also applies to the simplified algorithm according to the formulae (2b)). The first multiplication 100 is thus reduced to a single-bit operation.

The output signal of the second multiplier 101 is fed to the inverting input of a comparator 103, whose output is fed back to the non-inverting input via a delay element 104.

Figure 3:
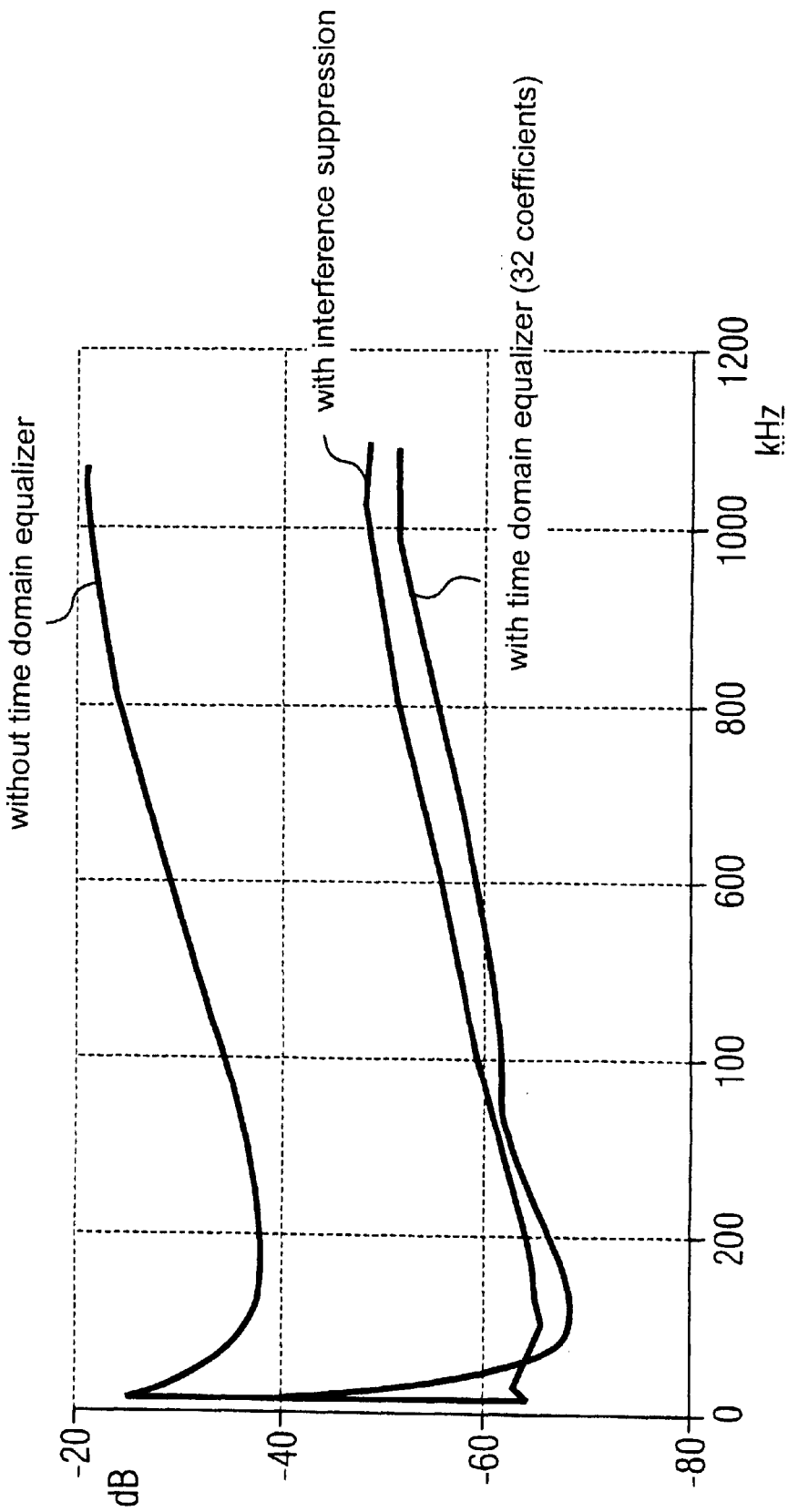
FIG. 3 is a plot diagram with the signal-to-noise ratio at the input of the decision circuit.

FIG. 3 shows the signal-to-noise ratio (SNR) for various methods for the compensation of interference at the input of each decision circuit 40, . . . , 4n. Without a time domain equalizer and interference suppression, an SNR of −40 to −20 dB over a frequency range up to approximately 1.1 MHz is achieved. With the invention's method for the compensation of interference (=interference suppressor), an SNR of −70 to approximately −45 dB is achieved, which corresponds to an improvement by on average 25 to 30 dB. An SNR of −70 to approximately −50 dB is achieved with a time domain equalizer which has 32 coefficients and is connected upstream of the demodulator 2.

FIG. 4 shows a second exemplary embodiment of the circuit configuration for the compensation of interference in a signal generated by discrete multitone modulation. In this case, all elements which are identical to the elements of the first exemplary embodiment are also provided with the same reference symbols.

Only the differences between the first and second exemplary embodiments are described below.

The error signal vector $\Delta a_0$, $\Delta b_0$ of the reference signal vector is fed to an apparatus 200, which adapts the error signal vector to the channels to be corrected.

To that end, firstly parameters for the error frequency response are calculated from the error signal vector and are then used to correct the other channels.

If the circuit configuration is considered as a $2^{nd}$ order system, it is possible to calculate the frequency response of the interference or of the error per channel downstream of the frequency response equalizers using the following equation:

$$Error_u = (c_1 + c_2 \cdot z_n) \cdot \frac{FEQ_n}{FEQ\_mod_n}$$

n channel index $Error_n$ Error of the $n^{th}$ channel $z_n$ $z_n = e^{j n \cdot T_a}$ with $T_a$ as sampling time (for example 2.208 MHz in the case of ADSL)

$FEQ_n$ coefficients of the frequency domain equalizer of the $n^{th}$ channel $FEQ\_mod_n$ coefficients of a modified frequency domain equalizer of the $n^{th}$ channel, $FEQ_n$ being transformed into the frequency domain by means of inverse Fourier transformation-and, at the same time, that part of the impulse response which lies within the cyclic prefix being "clipped".

The parameters $c_1$ and $c_2$ can be calculated from the reference channel—for example the $0^{th}$ channel—using the above equation:

$$Error_0 = (c_1 + c_2 \cdot z_0) \cdot \frac{FEQ_0}{FEQ\_mod_0}$$

Since this equation is complex, two equations—a real equation and an imaginary equation—are produced for the calculation of the two unknown parameters $c_1$ and $c_2$. As a result, the error frequency response can be analytically calculated for each further channel and used to correct the respective channel. It is advantageous that this method does not necessitate adaptation of coefficients during a transmission. The parameters c1 and c2 and thus the error frequency responses of the further channels only have to be calculated once from the reference channel. As a result, on account of the adaptation time saved, convergence problems cannot occur either.

After the calculation of the parameters $c_1$ and $c_2$ and of the error frequency response of each channel, the error signal vector is modified in the apparatus 200 either with 1/FEQ_mod, if correction is effected upstream of the frequency domain equalizers, or with FEQ/FEQ_mod, if correction is effected downstream of the frequency domain equalizers.

The error signal vector that has been adapted in this way is subsequently added, for the purpose of interference compensation, to the $n^{th}$ channel by means of the adder circuits 201 and 202.

We claim:

1. A method of compensating for interference in a signal generated by discrete multitone modulation, wherein the signal generated by discrete multitone modulation has a multiplicity of carrier frequencies each having a signal vector, which comprises the following method steps:

defining a signal vector of a multiplicity of signal vectors in a signal generated by discrete multitone modulation as a reference signal vector;

generating an error signal vector from the reference signal vector;

assigning to each of the signal vectors of the multiplicity of signal vectors, except for the reference signal vector, a set of adjustable coefficients and multiplying the error signal vector with the adjustable coefficients; and subsequently adding the error signal vector to each remaining signal vector of the multiplicity of signal vectors for the purpose of compensating for interference.

2. The method according to claim 1, which comprises adapting the adjustable coefficients in accordance with transmission conditions of a carrier frequency having the signal vector assigned to the adjustable coefficients.

3. The method according to claim 2, which comprises adjusting the adjustable coefficients using an iterative algorithm for the purpose of minimizing errors.

4. The method according to claim 3, which comprises adjusting the adjustable coefficients with a mean square error algorithm.

5. The method according to claim 1, which comprises mapping the reference signal vector in a value-discrete reference signal vector and subtracting the value-discrete reference signal vector from the reference signal vector for generating the error signal vector.

6. A circuit configuration for compensating for interference in a signal generated by discrete multitone modulation, the signal generated by discrete multitone modulation having a multiplicity of carrier frequencies in the frequency domain, and each carrier frequency having a signal vector, comprising:

a first decision circuit receiving a reference signal vector, said first decision circuit mapping the reference signal vector into a value-discrete reference signal vector;

a subtractor circuit connected to said first decision circuit for forming an error signal vector by subtracting the reference signal vector and the value-discrete reference signal vector from one another;

a multiplicity of adders receiving the error signal vector and adding the error signal vector to each of the remaining signal vectors, except for the reference signal vector; and multiplier circuits connected upstream of each of said adders in a signal flow direction, said multiplier circuits multiplying the error signal vector by adjustable coefficients.

7. The circuit configuration according to claim 6, wherein the adjustable coefficients are adjustable by a manipulated variable.

8. The circuit configuration according to claim 7, wherein the manipulated variable is a power of two.

9. A method of compensating for interference in a signal generated by discrete multitone modulation, wherein the signal generated by discrete multitone modulation has a multiplicity of carrier frequencies each having a signal vector, which comprises the following method steps:

defining a signal vector of a multiplicity of signal vectors in a signal generated by discrete multitone modulation as a reference signal vector;

generating an error signal vector from the reference signal vector;

calculating interference with the remaining signal vectors of the multiplicity of signal vectors in approximation from the error signal vector; and subtracting the calculated interference from the respective signal vector of the multiplicity of signal vectors for interference compensation.

* * * * *